Sept. 6, 1966  S. R. OVSHINSKY  3,271,584
RESISTANCE SWITCHES AND THE LIKE
Filed May 28, 1962  3 Sheets-Sheet 2

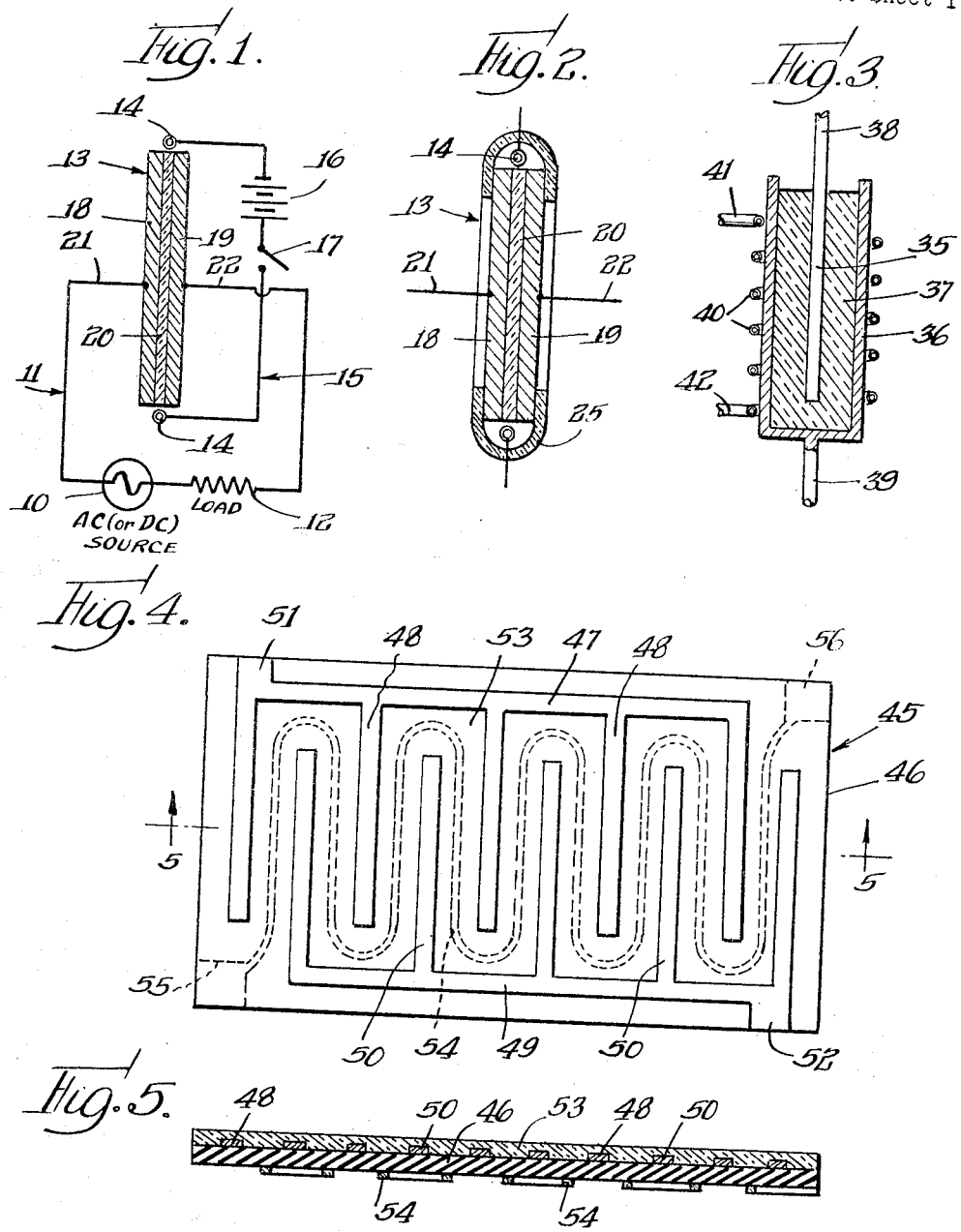

INVENTOR.
Stanford R. Ovshinsky
BY Wallenstein,
Spangenberg
& Hattis
Attys.

Sept. 6, 1966  S. R. OVSHINSKY  3,271,584
RESISTANCE SWITCHES AND THE LIKE
Filed May 28, 1962  3 Sheets-Sheet 3

INVENTOR.
Stanford R. Ovshinsky
BY Wallenstein
Spangenberg
Hattis
Attys.

United States Patent Office 3,271,584
Patented Sept. 6, 1966

3,271,584
RESISTANCE SWITCHES AND THE LIKE
Stanford R. Ovshinsky, Detroit, Mich., assignor, by mesne assignments, to Energy Conversion Devices, Inc., Troy, Mich., a corporation of Delaware
Filed May 28, 1962, Ser. No. 198,348
The portion of the term of the patent subsequent to Aug. 17, 1982, has been disclaimed
11 Claims. (Cl. 307—88.5)

This application is a continuation-in-part of my copending application Serial No. 118,642, filed June 21, 1961, and now abandoned.

The principal object of this invention is to provide solid state devices, such as current controlling devices, switches, relays, amplifiers and the like, for controlling the current flow in relatively high power electrical load circuits, as for example, commercial 110 and 220 volt circuits carrying currents in the multi-ampere range, wherein such solid state devices may substantially "open" and "close" said load circuits as a switch or modulate the current flow through said load circuits as a rheostat, and wherein such solid state devices may be controlled by suitable low power control circuits.

The solid state devices of this invention may operate as "resistance switches" and, under certain internal conditions, they are capable of blocking the flow of electrical current therethrough, while, at other internal conditions, they are capable of allowing a substantial flow of electrical current to pass therethrough, without requiring any mechanical motion of switching elements therein to make or break an electrical contact. I have found that a variation of temperature may constitute such a change in conditions. I have also found that a variation of applied electrical charge may be used to trigger a change of internal resistance suitable for effectuating this type of resistance switching.

Such solid state devices may be used to block or unblock a power line as a switch, circuit breaker or fuse, as a relay to open or close a separate power circuit, to actuate an alarm circuit, to amplify an applied electrical power input, or in other known ways. They may be used for very rapid change from a substantially "open" circuit to a substantially "closed" circuit, as in the case of conventional switches. Alternatively, they may be used as a rheostat or "dimmer switch," i.e. a switch which gradually causes a change from an "open" to a "closed" circuit, or vice versa, by gradual modulation of the amplitude of the current, as is sometimes desired in lighting circuits. They may also, if desired, be stabilized temporarily or indefinitely at one or more intermediate "partly closed" conditions. In general, they are useful for A.C. circuits, and in certain cases they may also be used for D.C. circuits.

More specifically, an object of the invention is to provide solid state resistance switches and the like, of the character above described, in which moving parts are eliminated. Another object of the invention is to provide solid state resistance switches and the like which are small in size, light in weight, exceptionally low in cost, and usable in any spatial position since they are independent of gravity for their operation. A further object of the invention is to provide solid state resistance switches and the like which are suitable for use with A.C. circuits, having the ability to block A.C. voltage of commercial magnitude, e.g. 110 to 220 volts, with no appreciable leakage, and which rapidly and reversibly change their internal resistance upon the application of an external stimulus to permit the flow of A.C. current therethrough with acceptably low internal resistance.

An advantage of the invention is that it provides switches, relays, and the like which are not subject to mechanical wear, since no moving parts are employed. Another advantage of the invention is that it provides amplifiers which are analogous in function to transistors, except that they are not limited to D.C. currents but are particularly adapted to A.C. circuits. A further advantage of the invention is that it provides devices capable of rapid or of slow change between "open" and "closed" position, or to partially closed position. A further advantage of the invention is that the devices provided are particularly useful in connection with missiles and spacecraft, since they are very light in weight, may be made free of moving parts or flowing fluids which might affect stability of flight, are operable in any spatial position since they are independent of gravity for their operating, and may if desired be powered by sunlight.

Other objects and advantages will more fully appear from the following description and drawings, wherein are disclosed preferred embodiments of the invention.

In the drawings:

FIG. 1 is a schematic diagram, showing one embodiment of the invention;

FIG. 2 is a fragmentary cross-sectional view of a modified type of resistance switch element which can be used in the system shown in FIG. 1;

FIG. 3 is a cross-sectional view of another type of resistance switch or current controlling device which can be used in the system shown in FIG. 1;

FIG. 4 is a greatly enlarged plan view of a further form of the resistance switch or current controlling device of this invention;

FIG. 5 is a sectional view taken substantially along the line 5—5 of FIG. 4;

Figure 6:
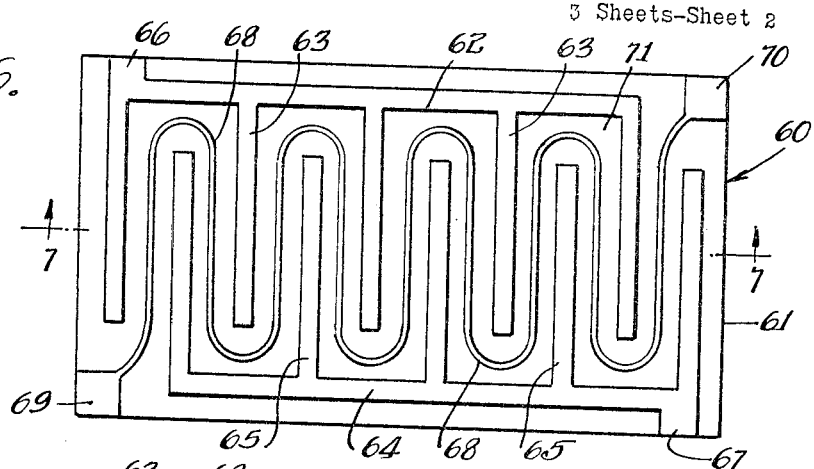
FIG. 6 is a plan view of still another form of the resistance switch or current controlling device of this invention.

Referring, now, to FIG. 1 of the drawings, there is shown schematically one embodiment of the invention comprising a solid state resistance switch which is operated by variation of its internal resistance with change of temperature. An A.C. or D.C. source 10, connected in the high power electrical load circuit indicated generally at 11, acts to send current through load 12. The solid state resistance switch element indicated generally at 13, however, normally blocks the flow of substantial current through circuit 11. A heating coil 14 suitably positioned adjacent to switch element 13 heats the switch element 13 when desired, thereby reducing its internal resistance (as discussed below), and hence in effect closes circuit 11 so as to allow the passage of the desired current therethrough at an acceptably low internal resistance.

Heating coil 14 may, for example, be activated by means of a low power electrical circuit indicated generally as 15, comprising a suitable source of electrical current such as battery 16 and a mechanical switch 17 which is closed when coil 14 is to be heated. Other known means for activating heating coil 14 may alternatively be employed.

The solid state resistance switch element 13 may, as shown, comprise a pair of electrically conductive metal plates or sheets 18, 19 forming electrodes, for example, copper, magnesium, stainless steel or other metals, and a thermally sensitive resistance lithium compound 20 of the character described below therebetween and in electrical contact therewith. Electrical leads 21 and 22 connect load circuit 11 to the outer faces of plates 18 and 19. The metal plates 18 and 19 may be in the form of discs, and the heating coil 14 may form substantially a ring around the switch element immediately adjacent (but not in electrical contact with) the resistance material 20.

When it is desired to heat resistance material 20, switch 17 may be closed, thereby heating coil 14 and indirectly heating resistance material 20. When switch 17 is opened, resistance material 20 is cooled by virtue of exposure to the ambient temperature. Plates 18 and 19 are preferably made as thin as possible, consistent with rigidity requirements, so that the heat capacity of the switch element is at a minimum, thereby allowing quick heating and cooling, as is desired for a rapid switching action. A thickness of the order of 0.005 to 0.05 inch gives good results. For rapid switching it is also desirable that resistance material 20 have a relatively small volume and large surface area. This is best obtained by utilizing said material in the form of a thin layer or film as shown in FIGURE 1, for instance, a film of monomolecular thickness and upwards to thicknesses of about 0.0005 to 0.01 inch. On the other hand, for slower switching action, the resistance material 20 may be in a more massive form.

It should be noted that if a switch 17 is used in the low power heating or control circuit 15, as in FIGURE 1, to control the temperature of the switch element 13, the switch 17 will be a very small switch which will in effect control the flow of a much larger current in the high power load circuit 11. There is thus, in effect, a large amplification of the current.

It should be understood, further, that the exposure of the switch element 13 to indirect heating is not necessarily limited to heating by means of coil 14. Any other suitable form of indirect heating, not necessarily involving the use of an electrical heater, may be employed. For example, in the case of a fire alarm system, no heating coil is required, the application of heat coming from the fire itself. In the case of a missile or spacecraft, the heating coil 14 may also be dispensed with, the heat being supplied by direct sunlight whenever the vehicle is oriented in the appropriate direction to receive sunlight directly or indirectly on said resistance switch element 13.

I have discovered that various normally solid lithium compounds may exceptionally effectively be employed as the thermally sensitive resistance material. Among such lithium compounds are lithium carbonate, lithium hydroxide, lithium orthosilicate, lithium sulfate, lithium hydrogen sulfate, lithium acetate, lithium metasilicate, lithium metaborates, lithium fluoride, lithium nitrate, lithium oxide, lithium orthophosphate, and mixtures of any two or more thereof. I find it most desirable to utilize the lower melting lithium compounds and, where the lithium compounds are to be exposed to atmospheric conditions, to utilize lithium compounds which are essentially non-hygroscopic, and which are generally water-insoluble or only slightly water-soluble, preferably having a solubility below 15 parts per 100 parts of cold water and, better still, a solubility below 8 parts per 100 parts of cold water. There are also low melting and somewhat hygroscopic materials which can be mixed with lithium compounds to provide melting points well under 300° C., such as, for example, the nitrates of silver, calcium, sodium, rubidium, potassium, ammonium, or the like. However, these would require inert atmosphere sealing.

I have found that, for the purpose of my present invention, the compositions obtained by essentially fully or completely burning metallic lithium in air or oxygen are especially satisfactory. Such latter compositions appear to comprise mixtures of lithium carbonate, lithium hydroxide, and lithium oxide generally in approximately equal proportions. Also, especially useful, is lithium hydroxide.

In those instances in which hygroscopicity and appreciable water-solubility of the lithium compounds present difficulties due to the particular ambient atmospheric conditions of the environment in which said lithium compounds are to be used, as, for example, in the case of lithium acetate, they may be encapsulated in an air free environment or, if desired, in an atmosphere of an inert gas such as helium, argon, nitrogen or the like. In this respect, FIGURE 2 illustrates one manner of encapsulating the lithium compound of the solid state device 13 of FIGURE 1, like reference characters being utilized for like parts. Here a closure 25, formed of gas impervious electrical insulating material, such as glass or the like, is formed over the edges of the device 13 and sealed thereto to protect the lithium compound layer 20 from the ambient atmospheric conditions, and, if desired, a suitable atmosphere of hydrogen or inert gas may be confined within the closure 25.

The various lithium compounds exhibit in their solid states substantial negative temperature-resistance coefficients, providing large uniform changes in electrical resistance upon changes in temperature thereof, and, accordingly, they are admirably suited for modulating control of the current flow in the load circuit 11 in accordance with the heating thereof by the control circuit 15. Here, the various lithium compounds and mixtures thereof are preferably selected as to their melting points and electrical characteristics so that they will remain in their solid states over the operating temperature range thereof to provide uniform modulating control of the current flow.

The various lithium compounds are also characterized by possessing a large resistivity in their solid state coupled with their exhibiting a sharp decrease in their resistivity or good electrical conductivity at certain elevated temperatures, including, for example, at their melting points. I have discovered, further, that the various lithium compounds which are stable at temperatures substantially in excess of their melting points will, in their solid states, block commercial voltages (e.g. 110 or 220 volts) with negligible "leakage" current, i.e. with resistances of $10^5$ ohms or more, while in their molten condition they have good electrical conductivities. Thus, the various lithium compounds, in accordance with this invention, may be advantageously used for "open" and "closed" circuit operation, they "opening" the load circuit 11 in their solid state and "closing" the load circuit 11 in their molten state under the control of the control circuit 15. Preferably, lithium compounds having relatively low melting points are here utilized so that they may be heated to their melting points with the use of the smallest amount of electrical energy in the control circuit 15 to provide maximum amplification between the control circuit 15 and the load circuit 11.

Where the lithium compounds are heated to their molten state for "open" and "closed" circuit operation, provision must be made for maintaining the molten lithium compounds in place and in electrical contact with the metal electrodes connected to the load circuit. This may be accomplished by suitably confining or encapsulating the lithium compounds. As for example, the closure member 25 of FIGURE 2 could be utilized for this purpose as well as for the purpose of protecting the lithium compounds from adverse effects of the atmosphere.

However, in accordance with a further important aspect of this invention, the lithium compounds are contained in a mixture having a solid diluent, so that the mixture at all times remains in a solid state even though small pools or rivulets of molten lithium compounds, which freely conduct current through the solid state mixture, are produced by heating the mixture to a value above the melting points of the lithium compounds. Thus, the solid diluent of the solid state mixture maintains the lithium compounds in place in the solid state mixture regardless of whether the lithium compounds themselves are in a solid state for "opening" the load circuit or in a molten state for "closing" the load circuit. When the solid state mixture is heated to a temperature sufficient to melt the lithium compounds into small pools or rivulets for conducting current therethrough, there is no physical change in the solid state mixture which is apparent to the eye so that there is provided, in accordance with this important phase of the invention, a truly solid state device for "opening" and "closing" a load circuit without the use of mechanically operated contacts, flowing liquids or the like and without the inherent difficulties and problems created thereby. Also, because of the self sustaining characteristics of the solid state mixtures of this invention, they may be readily used in a number of different manners for current controlling purposes, as for example, layers or films arranged between sheet type electrodes as described above in connection with FIGURES 1 and 2, bodies arranged between concentric electrodes and coatings or films on printed circuits as will be described in detail hereafter.

The solid diluents, of course, should not so react with the lithium compounds as adversely to affect the required electrical resistivity or conductivity characteristics nor to produce reaction products having undesirable properties. The solid diluent materials may fall into various categories, such as semi-conductors, finely divided metals, other compounds, and the like. In respect to this latter category, the other compounds, such as other lithium compounds or compounds of non-lithium material, may be selected to have relatively high melting temperatures so as to maintain the mixture in its solid state.

Also, in certain instances it may be desired to admix the lithium compound (which is to be heated to its molten state) with another material in order to provide an eutectic mixture or composition in the solid state mixture wherein the melting point of said lithium compound is lowered below its normal melting point. It is particularly preferred to achieve this by addition of other lithium compounds so as to provide, for instance, eutectic mixtures of lithium compounds. Thus, by way of example, mixtures of lithium hydroxide as the flux compound and lithium carbonate as the eutectic former can effectively be employed. In general, the added solid diluent material, whether it be another lithium compound or a non-lithium material, should be one which itself possesses relatively high resistivity at room temperature with relatively good conductivity at elevated temperatures. Also, while it is particularly desirable to use, as the meltable lithium compound or compounds, solely lithium compounds, other non-lithium meltable compounds may be included, in character or amount such that they do not materially adversely affect the desired properties and characteristics for the purposes here involved of the meltable lithium compounds utilized.

In connection with the solid state devices or switches described above, it should be noted that if a D.C. voltage is applied which is high enough to electrolyze the lithium compound comprising a component of the device or switch (and this may not require more than 1–5 volts), one must expect that said compound may eventually be thus decomposed. Thus, the devices or switches of the present invention should normally not be used as control devices or switches for D.C. sources, particularly at high voltages, but should normally be limited for such use with A.C. sources for which they are admirably suited. Commercial A.C. voltages (e.g. 110 or 220 volts) appear to cause little or no decomposition of the lithium compounds in the above-described devices or switches.

FIG. 3 illustrates another form of the resistance switch or current controlling device which is a substantially cylindrical type of device. Here, there are provided an inner metallic electrode 35 which may take the form of a wire and an outer tubular metallic electrode 36 concentrically arranged in spaced apart relation about the inner electrode. A lithium compound, of the type described above, having a negative temperature-resistance coefficient is interposed between the inner and outer electrodes 35 and 36 and is in electrical contact therewith. The inner electrode 35 may be extended to form a lead 38 and the outer electrode 36 may be provided with an extension 39 to form a lead for connecting the lithium compound 37 in series in the load circuit 11 of FIG. 1. A heater winding 40 is arranged about and electrically insulated from the outer electrode 36 for the purpose of heating the lithium compound therein, the heater coil 40 being provided with leads 41 and 42 for connecting the same into the heater circuit 15 of FIGURE 1.

The heater coil 40 heats and changes the temperature of the lithium compound 37 to increase the current flow in the electrical circuit 11 upon increase in the temperature of the lithium compound and to decrease the current flow in that circuit upon a decrease in temperature of the lithium compound. If the lithium compound 37 of the resistance switch or current controlling device of FIGURE 3 is such that it may be adversely affected by air or moisture, it may be encapsulated by providing a suitable closure or cover for the open end of the outer electrode 36 and, if desired, an atmosphere of inert gas, such as helium, argon, nitrogen or the like, may be contained in the devices in contact with the lithium compound.

A further form of the resistance switch or current controlling device of this invention is generally designated at 45 in FIGURES 4 and 5. It includes an electrical insulating sheet 46 which may be formed of any suitable material, such as mica, ceramic, thermosetting plastic material, or the like, or a suitable metallic substrate having an oxide coating acting as an electrical insulator, or beryllium oxide which is a good electrical insulator and a good conductor of heat. Upon one surface of the insulating sheet is applied a pair of metallic combs 47 and 49 having interleaving teeth 48 and 50 forming electrodes. The combs 47 and 49 may be applied in any suitable manner to the electrical insulating sheet 46, as by printing, silk-screening, vacuum plating or the like. The interleaving comb teeth 48 and 50 may be made quite thin and closely spaced, so as to provide great interleaving relation in a small surface area. The combs 47 and 49 may be provided with tab portions 51 and 52 for connecting the combs into the electrical load circuit 11 in FIG. 1. A coating or film 53 of a lithium compound of the kind described above is applied to the surface of the insulating sheet 46 over the teeth or electrodes 48 and 50 of the combs and in electrical contact therewith. The coating or film 53 of lithium compound may be applied to the surface of the insulating sheet 46 in various ways, as for example, by painting or squeegeing a slurry of the lithium compound thereon and heating and drying the same, by heating the insulating sheet and spraying a slurry of the lithium compound thereon which is baked and dried by the heated sheet, by fuming the lithium compound and subjecting the surface to the fumes which condense and adhere thereto, or by electron beam deposition in a vacuum, or the like. Preferably, the coating or film 53 is made quite thin, as for example, a film of monomolecular thickness and upwards to thicknesses of about 0.0005 to 0.01 inch. However, if desired, the coating or film may be in a more massive form. Thus, when the combs and hence the electrodes are connected into the load circuit 11 of FIGURE 1, the lithium compound between the electrodes is connected in series in that circuit for controlling the current flow therethrough in accordance with the temperature-resistance coefficient of the lithium compound.

A heater circuit 54 is applied to the other side of the electrical insulating sheet 46 as by printing, silk-screening, vacuum plating or the like, the heater circuit having tab portions 55 and 56 for connecting it into the control circuit 15 of FIGURE 1. When current passes through the heater circuit 54 the lithium compound is heated and changed in temperature to increase the current flow through the load circuit 11 upon an increase in temperature of the lithium compound and to decrease the current flow through the load circuit upon a decrease in temperature of the lithium compound. The arrangement of FIGURES 4 and 5, because of its large surface area and small thickness, is extremely fast acting in its control of the current flow through the load circuit and, because of the use of a plurality of teeth or electrodes 48 and 50, it has large current carrying capacities. Here, also, the lithium compound, if desired or necessary, may be encapsulated for protection against air or moisture by applying a suitable protective coating or sheet of air and moisture impermeable insulating material thereover.

Figure 7:
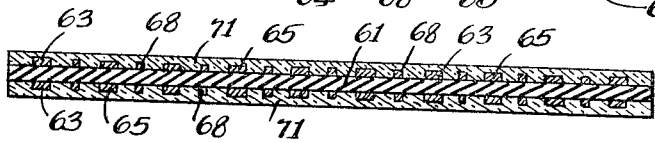
FIG. 7 is a sectional view taken substantially along the line 7—7 of FIG. 6.

Another form of the resistance switch or current controlling device is generally designated at 60 in FIGURES 6 and 7, this form being somewhat similar to that illustrated in FIGURES 4 and 5. Here a pair of metallic combs 62 and 64 are applied to one side of an electrical insulating sheet 61, the combs having interleaving teeth 63 and 65 forming spaced apart electrodes and having tab portions 66 and 67 for connecting the combs into the load circuit. A heater circuit 68 is applied to the same side of the electrical insulating sheet 61 between the interleaving teeth or electrodes 63 and 65. The heater circuit 68 is also preferably provided with tab portions 69 and 70 for connecting the same into the control circuit. The heater circuit 68 is also preferably provided with electrical insulation such as by applying a suitable electrical insulating material over the heater circuit. A layer or film of lithium compound 71 is then applied over the electrically insulated heater circuit and the electrodes 63 and 65, and it makes electrical contact with those electrodes but is electrically insulated from the heater circuit. The layer or film of lithium compound between the electrodes 63 and 65 is connected in series in the load circuit and controls the current flow therethrough in accordance with the temperature of the lithium compound. The heater circuit 68 is closely associated with the lithium compound, it being embedded therein, and it operates to quickly change the temperature of the lithium compound to provide an extremely fast acting resistance switch or current controlling device.

If desired, and as shown in FIGURE 7, additional combs, heater circuits and lithium compound layer or film may be applied to the other side of the insulating sheet 61 and the various tab portions of the combs and the heater circuits may extend over the edges of the electrical insulating sheet so as to connect them in parallel. By so doubling up the electrodes and heater circuits in parallel the current carrying capacity of the resistance switch or current controlling device 60 is greatly increased. The electrical insulating sheet 61 may be like the insulating sheet 46 described above, and the metallic combs 62 and 64 and the layer or film 71 of lithium compound may correspond to those described above in connection with FIGURES 4 and 5 in construction and manner of application. Here, again, the lithium compound, if desired or necessary, may be encapsulated for protection against air or moisture by applying a suitable protective coating or sheet of air and moisture impermeable insulating material thereover.

Figure 8:
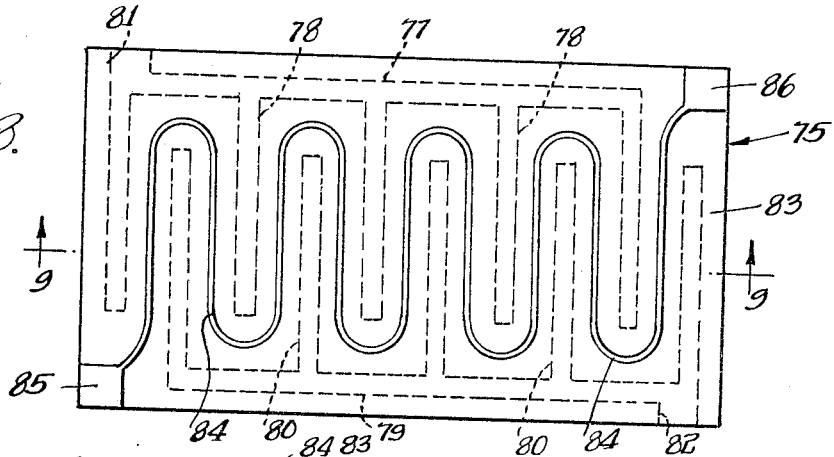
FIG. 8 is a plan view of still a further form of the resistance switch or current controlling device of this invention.
Figure 9:
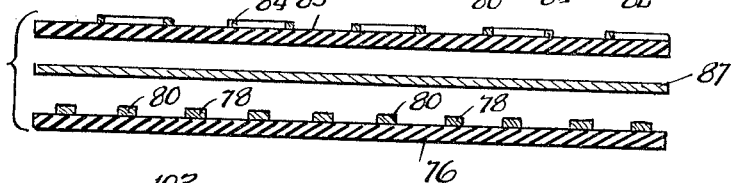
FIG. 9 is an exploded sectional view taken substantially along the line 9—9 of FIG. 8.

Still another form of the resistance switch or current controlling device is generally designated at 75 in FIGURES 8 and 9. Here, a pair of metallic combs 77 and 79 are applied to one face of a first electrical insulating sheet 76, these metallic combs having interleaving teeth or electrodes 78 and 80 and preferably being provided with tab portions 81 and 82 for connecting the combs into the load circuit. A heater circuit 84 is applied to a second electrical insulating sheet 83, the heater circuit 84 having tab portions 85 and 86 for connecting it into the control circuit. Interposed between the two electrical insulating sheets 76 and 83 is a layer or film 87 of a lithium compound, such as described above, having a substantial negative temperature-resistance coefficient. The electrical insulating sheets 76 and 83 are sandwiched together with the lithium compound layer or film 87 therebetween and the parts may be held in assembled relation by fusing the lithium compound layer or film to the electrical insulating sheets 76 and 83. The lithium compound layer or film 87 is in electrical contact with the teeth or electrodes 78 and 80 of the combs and it is therefore arranged in series in the load circuit for controlling the current flow therethrough. The second electrical insulating sheet 83 electrically insulates the heater circuit 84 from the lithium compound layer or film 87, and operates in conjunction with the first electrical insulating sheet 76 to encapsulate the layer or film 87 of lithium compound to protect the same from air and moisture. Here, as in the other arrangements, the electrical heater circuit 84 heats and changes the temperature of the lithium compound to increase the current flow through the load circuit upon increase in the temperature of the lithium compound and to decrease the current flow in the load circuit upon decrease of the lithium compound.

Figure 11:
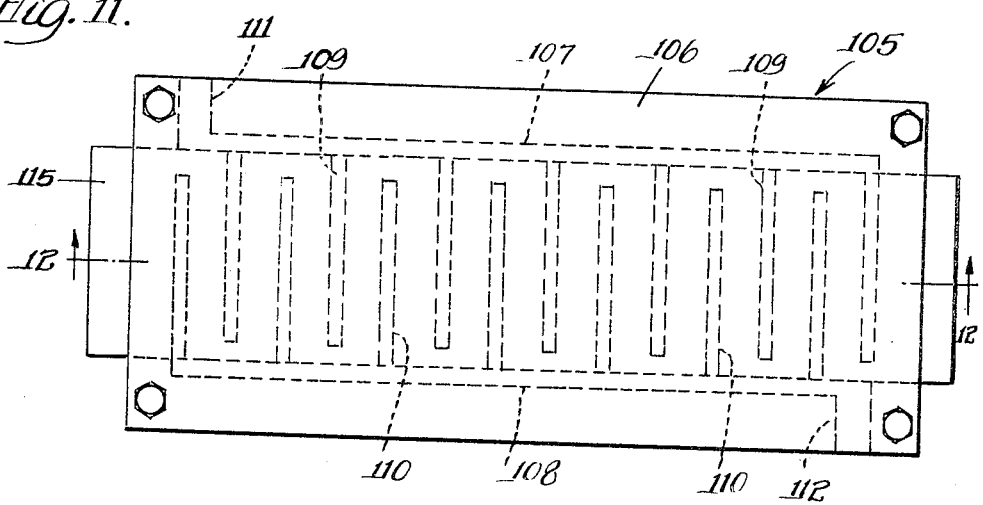
FIG. 11 is a plan view of still another form of the resistance switch or current controlling device of this invention.
Figure 12:
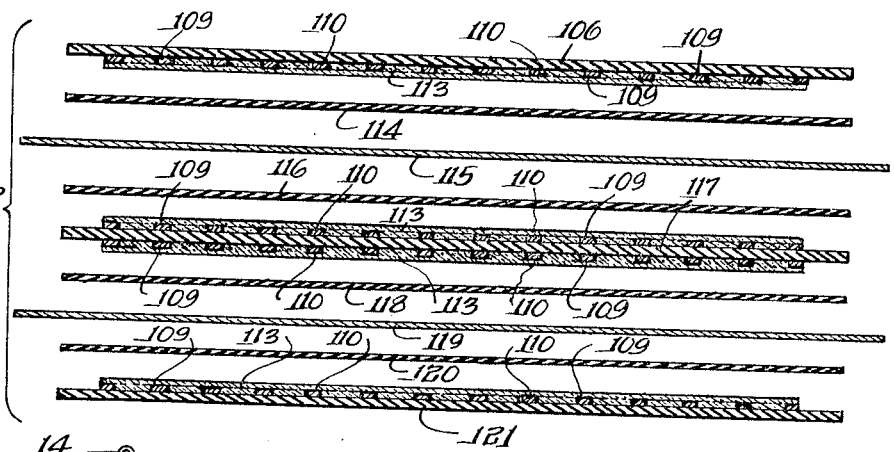
FIG. 12 is an exploded sectional view taken substantially along the line 12—12 of FIG. 11.

A still further form of the resistance switch or current controlling device of this invention is generally designated at 105 in FIGURES 11 and 12. Here, a pair of metallic combs 107 and 108, having interleaving teeth or electrodes 109 and 110, are applied to one face of an electrical insulating sheet 106, the combs preferably being provided with tab portions 111 and 112 for connecting the combs to the load circuit. A layer or film 113 of a lithium compound is applied to the electrical insulating sheet 106 over the interleaving teeth or electrodes 109 and 110 of the metallic combs 107 and 108. The electrical insulating sheet, the metallic combs and the layer or film of lithium compound are like those described above, and the metallic combs and the layer or film of lithium compound may be applied to the electrical insulating sheet also in the manner described above. A thin electrical insulating sheet 114, such as mica, beryllium oxide or the like, is applied over the electrical insulating sheet 106 in contact with the layer or film of lithium compound 113 and a heater element 115 in the form of a foil or the like is applied against the electrical insulating sheet 114. Another electrical insulating sheet 116 of mica, beryllium oxide or the like is then applied over the heater foil 115. A further electrical insulating sheet 117 having metallic combs 107 and 108 provided with interleaving teeth or electrodes 109 and 110 and having a layer or film 113 of lithium compound is then applied against the insulating sheet 116. Thus, there is provided an assembly consisting of two layers or films of lithium compound in contact with the teeth or electrodes of the metallic combs along with a heater foil 115 interposed therebetween and electrically insulated from the layers or films of lithium compound by thin electrical insulating sheets. Thus, when electrical current is passed through the heater foil 115 by the control circuit of FIGURE 1, the two layers or films of lithium compound are rapidly heated so as to provide a resistance switch or current controlling device which is capable of carrying large currents in the load circuit of FIGURE 1, and which is fast operating in its response. Here, also, the electrical insulating sheets 106 and 117 operate to encapsulate the lithium compound layers or films to protect them against the effects of air or moisture.

This arrangement may also be built in the form of a stack incorporating a number of these assemblies. For example, in this respect, the other side of the electrical insulating sheet 117 may be provided with metallic combs 107 and 108 having interleaving teeth or electrodes 109 and 110 which are covered with a layer or film 113 of lithium compound. Here, also, there is utilized a thin electrical insulating sheet 118, a heater foil 119, an electrical insulating sheet 120 and an electrical insulating sheet 121 having metallic combs 107 and 108 with interleaving teeth or electrodes 109 and 110 and a layer or film of lithium compound 113. Thus, the two assemblies may be stacked together with the electrical insulating sheet 117 with its metallic combs and lithium layers or films forming a common element of each assembly. Any number of such assemblies may be correspondingly stacked to provide still further current carrying capacity.

Figure 13:
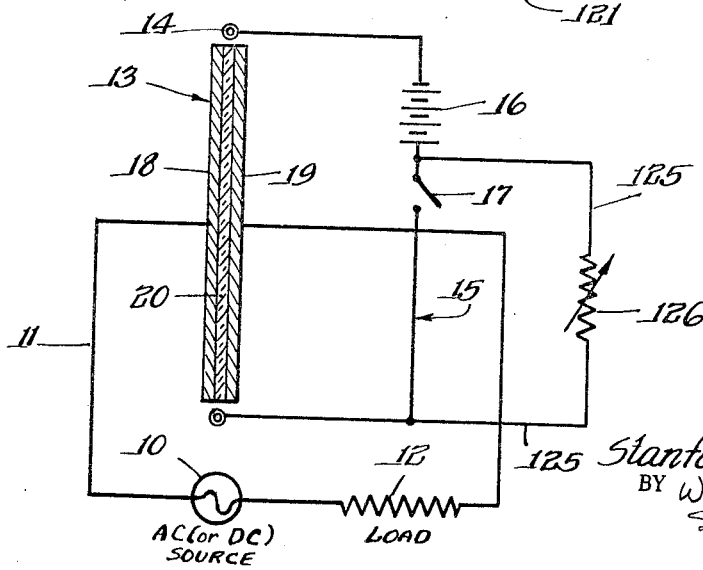
FIG. 13 is a schematic diagram showing a further mode of activation of a resistance switch element made in accordance with this invention.

As expressed above, the lithium compounds are characterized by possessing large resistivity in their solid states coupled with their exhibiting a sharp decrease in their resistivity or good electrical conductivity in their molten states. Thus, "open" and "closed" circuit operation may be advantageously obtained by so controlling the temperature of the lithium compounds to rapidly change them from their solid to molten states and vice versa. This may be readily accomplished by the circuit arrangement of FIGURE 13, which corresponds to that of FIGURE 1, like reference characters being utilized for like parts. In addition, FIGURE 13 includes means for normally maintaining the lithium compound 20 at an elevated temperature which is somewhat below the melting point of the lithium compound, this being accomplished, for example in FIGURE 13, by having an adjustable resistance 126 connected in shunt with the control switch 17 by connections 125.

When the control switch 17 is open, as shown, a limited amount of current is applied to the heater 14 through the resistance 126 to heat the layer 20 of lithium compound to an elevated temperature which is below the melting point of the lithium compound. Under these conditions, the resistance of the lithium compound is relatively high so as to effectively block large current flow therethrough so that the load circuit 11 is effectively "open." When, however, the control switch 17 is closed, the resistance 126 is shunted to increase the current flow through the heater 14 whereupon the lithium compound is quickly heated to its molten state. Under these conditions, the resistivity of the lithium compound sharply decreases to provide relatively good electrical conductivity therethrough so that the load circuit 11 is effectively "closed." Upon opening of the control switch, the lithium compound quickly cools to its solid state to a temperature determined by the resistance 126 to effectively "close" the load circuit. Thus, quick "opening" and "closing" of the load circuit is provided with a minimum time lag. Also, the shunt resistance 126 may be used in those situations, where heating of the lithium compound to the molten state is not necessary or desired, to maintain a desired minimum temperature condition in the lithium compound to provide a "partly closed" condition.

Also, as expressed above, where heating of the lithium compound to a molten state is desired, the molten lithium compound may be held in situ by admixing it with other materials, such as diluent materials including semi-conductors and finely divided metals, and other compounds uncluding lithium compounds, having higher melting points. In the latter case, eutectic mixtures of the compounds may be used to provide lower melting points for the lithium flux compound. A particularly good eutectic mixture includes lithium hydroxide as the flux and lithium carbonate as the euctectic-former and this composition may be used with a metal diluent if desired. These various solid state admixtures, including lithium compounds, may be utilized in connection with all the various forms of the resistance switch of this invention, the molten lithium compound being held in situ in the solid state admixture.

Figure 10:
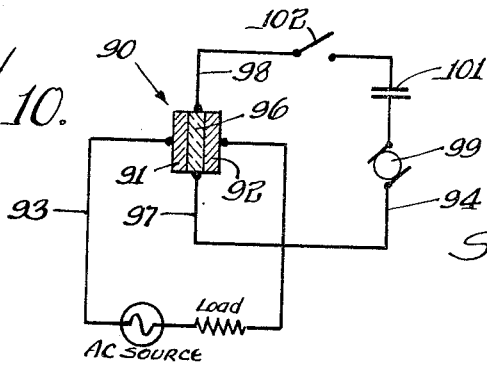
FIG. 10 is a schematic diagram showing another mode of activation of a resistance switch element made in accordance with this invention.

I have also found that the aforementioned switch elements may be activated by means of an applied voltage instead of by indirect heating. One method of doing this is shown schematically in FIGURE 10. The resistance switch element 90 in this case (comprising the lithium compound 96 as such or together with such diluents as may be desired) is shown schematically between metal plates 91 and 92 forming electrodes which are in the principal A.C. electrical load circuit 93. A secondary electrical circuit 94 is shown connected across the opposite edges of the lithium compound material 96 through leads 97 and 98. A D.C. generator 99 is shown in this circuit 94, supplying a condenser 101 when switch 102 is open. When switch 102 is instantaneously closed and opened, condenser 101 discharges through the material 96, instantaneously activating switch element 90 to pass A.C. current continuously through circuit 93.

In the claims which follow, I have used the term "switch" in the generic sense described above, i.e. so as to include relays and the like, and I have used expressions such as "open" and "close" an electrical circuit to signify that the resistance of the switch element varies from a sufficiently high value to reduce any current flow therethrough to an acceptably low minimal, substantially negligible value (when "open"), to a sufficiently low resistance to permit current to flow therethrough at an acceptably low power loss and maximal current (when "closed").

I claim:
1. A relay switch device for an electrical load circuit, comprising spaced apart metallic electrodes, a solid state composition containing a mixture of at least one lithium compound and a self supporting solid diluent having a melting point higher than said at least one lithium compound and being interposed between and in electrical contact with the electrodes, means connected to said electrodes for connecting said solid state composition in series with the electrical load circuit for controlling the current flow therethrough in accordance with the resistance value of said composition, said solid state composition normally having one condition of high electrical resistance value which is sufficient to "open" the electrical load circuit and another different condition of low electrical resistance value which is sufficient to "close" the electrical load circuit, and means including an electrical control circuit for applying an electrical potential to said solid state composition for changing said solid state composition from its said one condition of high electrical resistance to its said other different condition of low electrical resistance for selectively "switching" the electrical load circuit from "opened" to "closed" circuit conditions.

2. A relay switch device for an electrical load circuit, comprising spaced apart metallic electrodes, a solid state composition containing a mixture of at least one lithium compound and a self supporting solid diluent having a melting point higher than said at least one lithium compound and being interposed between and in electrical contact with the electrodes, means connected to said electrodes for connecting said solid state composition in series with the electrical load circuit for controlling the current flow therethrough in accordance with the resistance value of said composition, said solid state composition being in a condition of high resistance to "open" the electrical load circuit when said at least one lithium compound is in a solid condition and being in a condition of low resistance sufficient to "close" the electrical load circuit when said at least one lithium compound is in a molten condition, said self-supporting solid diluent of said composition serving to maintain said at least one molten lithium compound in place at all times in said solid state composition, and means including an electrical control circuit for changing the temperature of said solid state composition to transform it from its said one condition of high electrical resistance to its said other condition of low electrical resistance for selectively "switching" the electrical load circuit from "opened" to "closed" circuit conditions.

3. A relay switch device for an electrical load circuit, comprising spaced apart metallic electrodes, a solid state composition containing a mixture of at least one lithium compound and a self supporting solid diluent having a melting point higher than said at least one lithium compound and being interposed between and in electrical contact with the electrodes, means connected to said electrodes for connecting said solid state composition in series with the electrical load circuit for controlling the current flow therethrough in accordance with the resistance value of said composition, said solid state composition being in a condition of high resistance sufficient to "open" the electrical load circuit when said at least one lithium compound is in a solid condition and being in a condition of low resistance sufficient to "close" the electrical load circuit when said at least one lithium compound is in a molten condition, said self-supporting solid diluent of said composition serving to maintain said at least one molten lithium compound in place at all times in said composition, and means including an electrical control circuit for applying an electrical potential to said solid state composition to transform it from its said one condition of high electrical resistance to its said other condition of low electrical resistance for selectively "switching" the electrical load circuit from "opened" to "closed" circuit conditions.

4. A relay switch device for an electrical load circuit, comprising spaced apart metallic electrodes, a solid state composition containing a mixture of at least one lithium compound and a self supporting solid diluent having a melting point higher than said at least one lithium compound and being interposed between and in electrical contact with the electrodes, means connected to said electrodes for connecting said solid state composition in series with the electrical load circuit for controlling the current flow therethrough in accordance with the resistance value of said composition, said solid state composition being in a condition of high resistance sufficient to "open" the electrical load circuit when said at least one lithium compound is in a solid condition and being in a condition of low resistance sufficient to "close" the electrical load circuit when said at least one lithium compound is in a molten condition, said self supporting solid diluent of said composition serving to maintain said at least one molten lithium compound in place at all times in said solid state composition, and means including an electrical heater adjacent said solid state composition and an electrical control circuit for said electrical heater for changing the temperature of said solid state composition to transform it from said said one condition of high electrical resistance to its said other condition of low electrical resistance for selectively "switching" the electrical load circuit from "opened" to "closed" circuit conditions.

5. A relay switch device for an electrical load circuit, comprising spaced apart metallic electrodes, a solid state composition containing a mixture of at least one lithium compound and a self supporting solid diluent having a melting point higher than said at least one lithium compound and being interposed between and in electrical contact with the electrodes, said mixture containing a plurality of lithium compounds of different melting points, means connected to said electrodes for connecting said solid state composition in series with the electrical load circuit for controlling the current flow therethrough in accordance with the resistance value of said composition, said solid state composition normally having one condition of high electrical resistance value which is sufficient to "open" the electrical load circuit when the lithium compound of lower melting point is in a solid condition and another different condition of low electrical resistance value which is sufficient to "close" the electrical load circuit when the lithium compound of lower melting point is in a molten condition, said self-supporting solid diluent of said solid state composition serving to maintain said lithium compound of lower melting point in place at the times in said composition, and means including an electrical heater adjacent said solid state composition and a control circuit for said electrical heater for changing the temperature of said solid state composition for changing said solid state composition from its said one condition of high electrical resistance to its said other different condition of low electrical resistance for "switching" the electrical load circuit from "opened" to "closed" circuit conditions.

6. A relay switch device for an electrical load circuit, comprising spaced apart metallic electrodes, a solid state comprising spaced apart metallic electrodes, a solid state compound and a self supporting solid diluent and being interposed between and in electrical contact with the electrodes, said solid diluent of said mixture being a lithium compound of higher melting point than the melting point of said at least one lithium compound of said mixture, means connected to said electrodes for connecting said solid state composition in series with electrical load circuit for controlling the current flow therethrough in accordance with the resistance value of said composition, said solid state composition normally having one condition of high electrical resistance value which is sufficient to "open" the electrical load circuit when said at least one lithium compound is in a solid condition and another different condition of low electrical resistance value which is sufficient to "close" the electrical load circuit when said at least one lithium compound is in a molten condition, said self-supporting solid diluent of said solid state composition serving to maintain said at least one lithium compound in place at all times in said composition, and means including an electrical heater adjacent said solid state composition and a control circuit for said electrical heater for changing the temperature of said solid state composition for changing said solid state composition from its said one condition of high electrical resistance to its said other different condition of low electrical resistance for selectively "switching" the electrical load circuit from "opened" to "closed" circuit conditions.

7. A relay device for an electrical load circuit, comprising spaced apart metallic electrodes, a solid state composition containing a mixture of at least one lithium compound and a self supporting solid diluent and being interposed between and in electrical contact with the electrodes, said mixture comprising a eutectic forming mixture of lithium compounds of different melting points, the lithium compound of higher melting point being in excess of the amount required for the eutectic mixture and forming the self-supporting solid diluent of the solid state composition, means connected to said electrodes for connecting said solid state composition in series with the electrical load circuit for controlling the current flow therethrough in accordance with the resistance value of said composition, said solid state composition normally having one condition of high electrical resistance value which is sufficient to "open" the electrical load circuit when the eutectic is in a solid condition and another different condition of low electrical resistance value which is sufficient to "close" the electrical load circuit when the eutectic is in a molten condition, said self-supporting solid diluent of said solid state composition serving to maintain the eutectic in place at all time in said composition, and means including an electrical heater adjacent said solid state composition and a control circuit for said electrical heater for changing the temperature of said solid state composition for changing said solid state composition from its said one condition of high electrical resistance to its said other different condition of low electrical resistance for selectively "switching" the electrical load circuit from "opened" to "closed" circuit conditions.

8. A relay switch device for an electrical load circuit, comprising an electrical insulating sheet, a pair of metallic combs applied to said sheet and having a plurality of spaced apart interleaving teeth forming a plurality of spaced apart electrodes, a solid state composition containing a mixture of at least one lithium compound and a self supporting solid diluent having a melting point higher than said at least one lithium compound and applied to said sheet and in electrical contact with said electrodes, means connected to said electrodes for connecting said solid state composition in series with the electrical load circuit for controlling the current flow therethrough in accordance with the resistance value of said composition, said solid state composition normally having one condition of high electrical resistance value which is sufficient to "open" the electrical load circuit when at least one lithium compound is in a solid condition and another different condition of low electrical resistance value which is sufficient to "close" the electrical load circuit when said at least one lithium compound is in a molten condition, said self-supporting solid diluent of said composition serving to maintain said at least one lithium compound in place at all times in said composition, and means including an electrical heater applied to said sheet and an electrical control circuit therefor for changing said solid state composition from its said one condition of high electrical resistance to its said other different condition of low electrical resistance for selectively "switching" the electrical load circuit from "opened" to "closed" circuit conditions.

9. A relay switch device for an electrical load circuit, comprising spaced apart metallic electrodes, a solid state composition containing a mixture of at least one lithium compound and a self supporting solid diluent having a melting point higher than said at least one lithium compound and being interposed between and in electrical contact with the electrodes, means connected to said electrodes for connecting said solid state composition in series with the electrical load circuit for controlling the current flow therethrough in accordance with the resistance value of said composition, said solid state composition normally having one condition of high electrical resistance value which is sufficient to "open" the electrical load circuit and another different condition of low electrical resistance value which is sufficient to "close" the electrical load circuit, means including an electrical heater adjacent said solid state composition and a control circuit for said electrical heater for changing the temperature of said solid state composition for changing said solid state composition from its said one condition of high electrical resistance to its said other different condition of low electrical resistance for selectically "switching" the electrical load circuit from "opened" to "closed" circuit condtions, and means in said control circuit for preventing the temperature of the solid state composition from decreasing below a desired minimum elevated value when in said "opened" circuit condition.

10. A relay switch device for an electrical load circuit, comprising an electrical insulating sheet, a pair of metallic combs applied to one side of said sheet and having a plurality of spaced apart interleaving teeth forming a plurality of spaced apart electrodes on said one side of said sheet, a second electrical insulating sheet having an electrical heater circuit applied to one side thereof, a solid state composition containing a mixture of at least one lithium compound and a self supporting solid diluent having a melting point higher than said at least one lithium compound interposed between said insulating sheets and in electrical contact with the electrodes, means connected to said combs and hence to said electrodes for connecting said mixture between said sheets with the electrical load circuit for controlling the current flow therethrough in accordance with the resistance value of said mixture, said mixture normally having one condition of high electrical resistance value which is sufficient to "open" the electrical load circuit and another different condition of low electrical resistance value which is sufficient to "close" the electrical load circuit, and means including a control circuit for passing current through said heater circuit for changing the temperature of said mixture for changing said mixture from its said one condition of high electrical resistance to its said other different condition of low electrical resistance for selectively "switching" the electrical load circuit from "opened" to "closed" circuit conditions.

11. A relay switch device for an electrical circuit, comprising a pair of spaced apart electrical insulating sheets, a pair of metallic combs applied to one side of each of said sheets and having a plurality of spaced apart interleaving teeth forming a plurality of spaced apart electrodes on said one side of said sheets, a layer of a solid state composition contaniing a mixture of at least one lithium compound and a self supporting solid diluent having a melting point higher than said at least one lithium compound applied to each of said sheets and in electrical contact with the electrodes thereon, a second pair of spaced apart insulating sheets applied to and in contact with said layers of said mixture, an electrical heater element interposed between said second pair of insulating sheets, means connected to said combs and hence to said electrodes for connecting said layers of said mixture with the electrical circuit for controlling the current flow therethrough in accordance with the resistance value of said mixture, said mixture normally having one condition of high electrical resistance value which is sufficient to "open" the electrical circuit and another different condition of low electrical resistance value which is sufficient to "close" the electrical circuit, and means for passing current through said heater element for changing said mixture from its said one condition of high electrical resistance to its said other different condition of low electrical resistance for "switching" the electrical circuit from "opened" to "closed" circuit conditions.

References Cited by the Examiner

UNITED STATES PATENTS

| | | | |
|---|---|---|---|
| 1,406,352 | 2/1922 | Demmler | 338—23 X |
| 1,515,202 | 11/1924 | Hineline | 200—113.3 X |
| 1,626,931 | 5/1927 | Grondahl. | |
| 2,178,548 | 11/1939 | Black et al. | 338—24 |
| 2,587,916 | 3/1952 | Squier | 338—26 |
| 2,627,570 | 2/1953 | Hall | 338—30 X |
| 2,727,118 | 12/1955 | Longini et al. | 338—25 |
| 2,842,648 | 7/1958 | Reynolds | 338—26 |
| 2,863,033 | 12/1958 | Wallace. | |
| 3,017,592 | 1/1962 | Keller et al. | 338—28 |
| 3,064,222 | 11/1962 | Renier | 338—25 |
| 3,201,736 | 8/1965 | Ovshinsky | 338—25 |

FOREIGN PATENTS 537,155   4/1941   Great Britain.

ATHONY BARTIS, *Acting Primary Examiner.*

RICHARD M. WOOD, *Examiner.*

H. T. POWELL, W. D. BROOKS, *Assistant Examiners.*